April 1, 1952 A. G. COOLEY 2,591,138

FACSIMILE APPARATUS EMPLOYING A STYLUS

Filed Feb. 15, 1947

INVENTOR.
A. G. COOLEY
BY E. R. Evans
Attorney

Patented Apr. 1, 1952 2,591,138

UNITED STATES PATENT OFFICE 2,591,138

FACSIMILE APPARATUS EMPLOYING A STYLUS

Austin G. Cooley, New York, N. Y., assignor to Times Facsimile Corporation, New York, N. Y., a corporation of New York Application February 15, 1947, Serial No. 728,865

7 Claims. (Cl. 346—74)

The present invention relates to the transmission and reception of pictures, maps, messages and the like, and more particularly to facsimile transmitting and receiving apparatus employing a stylus or marking point of the electric-current conduction type.

Apparatus of this type usually includes one or more styli arranged to operate in conjunction with an electro-sensitive sheet in the case of a recorder or a sheet bearing the copy to be transmitted in the case of a transmitter. Various means may be provided to obtain relative movement between the sheet and the stylus or marking point to produce scanning of the sheet or copy. A construction employing a current-conducting stylus is advantageous in the so-called continuous recorder in which the record-receiving sheet is fed from a roll by suitable web-feeding means so that it is unnecessary to stop and reload the recorder after each transmission. However, the use of a stylus in this type of recorder is attended with difficulties which have prevented or curtailed its use in actual practice.

Heretofore it has been considered impractical to utilize stylus recording means in a high-speed recorder or where high definition is required because of the difficulty of aligning the styli and compensating for the effect of wear in a relatively short period of use. Accordingly, it has been proposed to use a recorder provided with a helix and printer bar for high-speed applications on account of the simplicity of the mechanical design and construction. An example of this type of recorder is illustrated in the patent to Young, #1,848,862 dated March 2, 1932, employing carbon paper between the printer bar and the recording sheet. Another similar type of recorder employs a wet electrolytic paper which is marked by the flow of current between the helix and the conducting sheet of paper. While these recorders are of simple mechanical construction, they are subject to certain drawbacks and limitations like any mechanism having moving parts which wear and get out of adjustment. Accordingly, it is an object of the present invention to provide an improved recording or scanning mechanism of the conducting stylus type which may be operated at a high speed, which has improved definition and in which the wear on the stylus is compensated for in a simple and effective manner.

Another feature of the invention relates to the novel mechanism for positioning the stylus in relation to the cooperating sheet or record-receiving paper. As will be pointed out, this feature may be employed either in transmitters of the stylus type or in a recorder employing a stylus or marking point.

Another feature of the invention relates to improved means for guiding each of a plurality of successively operable styli in facsimile apparatus of the character described.

Still another feature of the invention relates to an improved stylus for a transmitter or recorder in which there is relative scanning movement between the point of the stylus and the cooperating sheet or record-receiving medium.

Other objects and advantages of the invention will become apparent after a consideration of the following description of the preferred embodiments thereof shown in the accompanying drawings.

Figure 1:
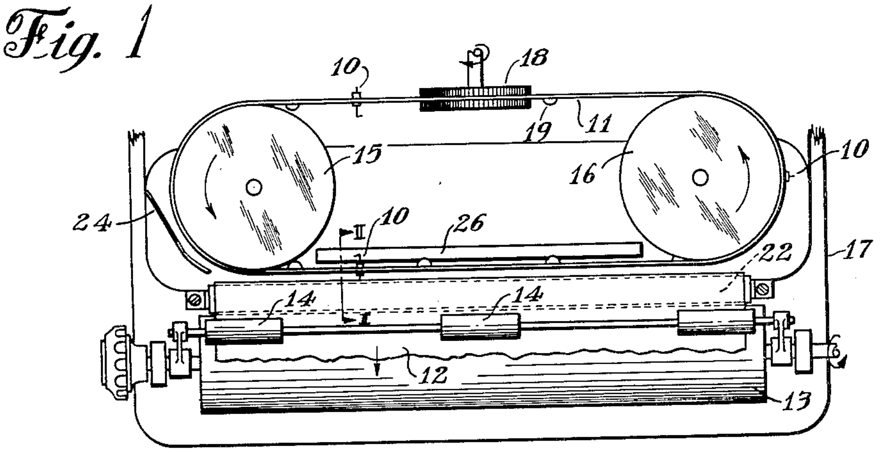
Fig. 1 is a plan view of a web or continuous electrical recorder embodying the invention, certain parts being omitted for the sake of clearness.

Referring to Fig. 1, the continuous recorder shown employs three equally spaced styli 10 in the form of small, slender rods or needles carried by a travelling belt 11 in operative relationship to a sheet 12 of electro-sensitive recording paper or other record-receiving medium supported at the recording area parallel to one span of the belt 11 as shown. Suitable means for supporting and advancing the sheet 12 include the driven paper feed roll 13 and the pressure rollers 14 arranged to clamp the sheet against the feed roll. The arrangement for supporting and feeding the sheet forms no part of the present invention and therefore is not illustrated in detail, the arrangement shown being similar to that illustrated in the prior application of Cooley and Busch, Ser. No. 679,703, filed June 27, 1946.

Figure 3:
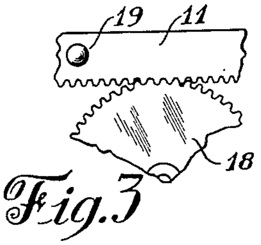
Fig. 3 is a detail view of the drive gear of Fig. 1.

The belt or stylus carrier 11 in the embodiment shown is supported by the pivoted discs or pulleys 15 and 16 journaled upon vertical axes in a frame or base 17. The belt is driven at a uniform speed, as for example, by a drive gear 18 which is synchronized with the transmitter in the usual manner. As shown, the gear 18 is a spur gear engaging teeth formed on the lower edge of the belt 11 (see Fig. 3). Preferably, the diameter of the gear 18 is such that the gear makes one complete revolution while the belt is travelling a distance equal to the linear spacing of the styli 10 so that imperfections in the gear teeth from wear or other causes do not cause distortion of the recorded copy. This feature is disclosed and claimed in prior application referred to above, which illustrates the detailed construction and arrangement of a preferred form of belt and drive mechanism. The belt is preferably a flexible metallic belt, for example, of beryllium copper or other durable resilient material. Furthermore, as explained in said prior application, means are provided for preventing creepage of the belt on the faces of the pulleys 15 and 16 as typified by the conical guide buttons 19 adapted to engage the edges of fitted grooves in the pulleys. Each stylus or the entire belt 11 is insulated from the frame 17 in any suitable manner, as by insulating the shafts or bearings of the pulleys 15 and 16, and of gear 18.

While the apparatus shown in Fig. 1 has been referred to as a recorder, the same general principles may be embodied in a transmitter where the sheet 12 would, for example, comprise a copy having lines of different conductivity than the body of the sheet, the lines representing the message to be transmitted. As is well known in the art, copy of this kind can be transmitted by facsimile scanning means including a stylus arranged to contact the surface of the copy where the stylus and copy have relative scanning motion.

In either type of machine, the fidelity and definition of the copy received, as well as the permissible operating speed, are determined to a large degree by the accuracy with which each of the styli may be positioned and moved with reference to the cooperating sheet. In theory it is necessary for each stylus 10 to engage the surface of the sheet with a steady contact pressure and for each successive stylus to be moved at the same speed across the sheet while it is positioned with extreme accuracy in both vertical and lateral directions, since any misalignment of the order of five thousandths of an inch or more is readily visible as a distortion of the recorded message or copy. While the styli may be initially positioned and moved with the desired accuracy by carefully locating the styli during assembly and constructing the machine with the requisite precision, the wear on the styli requires that they be replaced at suitable intervals without undue difficulty. Heretofore, this replacement could not be properly done except in the factory. Furthermore, even a slight amount of wear will affect the contact pressure against the paper or even cause the styli to be spaced from the paper, and without simple and effective means for compensating for the wear of the styli, poor recording results are obtained and an undue amount of maintenance attention or servicing is required.

Figure 2:
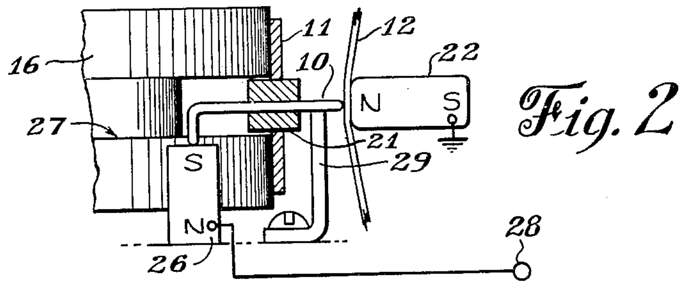
Fig. 2 is a sectional view to an enlarged scale taken on the line II—II of Fig. 1.

In accordance with the invention each stylus 10, as shown more clearly in Fig. 2, is mounted in a tubular holder or socket 21 carried by the movable carrier or belt 11. The stylus 10 is not pinched or gripped by the holder 21 but, being in the form of a straight, slender rod of uniform cross-section, is adapted to move freely in a direction normal to the sheet 12 which it engages at the outer or tip end of the stylus. In order to maintain the stylus 10 in contact with the sheet 12 at the marking area, magnetic means such as a bar magnet 22 is disposed underneath the sheet opposite the stylus. The length of the bar magnet may be substantially equal to the width of the sheet 12, as shown, or of any other desired length. The magnet preferably consists of a permanent magnet such as Alnico. The stylus 10, being of steel or other magnetizable material, is attracted by the magnet and held against the paper with a substantially uniform contact pressure during each traverse of the stylus across the recording area of the sheet 12. If desired, a guide 24 or other suitable means may be provided for preventing the stylus from projecting too far out of the holder 21 before it contacts the sheet. As the point of the stylus 10 wears in operation, the wear is automatically compensated since the point of the stylus is held against the sheet by the magnet 22. With this construction, it is found that the desired steady contact of the stylus or marking point with the sheet at a substantially uniform pressure is maintained throughout a long period of use.

In order to function properly, the magnet 22 must be strong enough to attract the stylus 10 against the paper when the stylus has been accidentally displaced to produce considerable spacing at the tip end. If the stylus is freely slidable in the holder 21, the magnet will draw the stylus forward even when there is a comparatively large gap between the tip of the stylus and the paper. It has been found that there is less likelihood of the stylus sticking or binding in the holder 21 in use, because of dirt or foreign matter clogging the holder, if the stylus is oscillated or twisted periodically with respect to the holder. As shown in Fig. 2, this is accomplished by suitable mechanism arranged to rock the offset portion at the rear end of the stylus 10. When the particular stylus 10 which is operative approaches the recording area, the offset portion at the rear end of the stylus engages a contact bar 26, through which the operating potential may be applied to the stylus. As indicated, the contact bar or segment 26 may be magnetized to maintain the desired contact relation. In order to rock the stylus in the holder 21 for the purpose described above, there is a slight difference or offset between the top surface of the bar 26 and the edge 27 of the groove in the wheel 16. Thus, as the trailing edge of the stylus 10 leaves the bar 26 and engages the wheel 16, the stylus 10 is twisted in the holder 21 and then restored to its original position when the stylus again engages the magnetized contact bar 26. The recording circuit may be completed by grounding the bar magnet 22, which thus constitutes a second contact bar located at the recording area of the sheet 12.

As shown in Fig. 2, a guide bar 29 disposed between the belt 11 and the sheet 12 is preferably provided for steadying the stylus in a vertical direction during the horizontal traverse across the face of the sheet 12. For this purpose, the upper or stylus-engaging edge of the guide bar extends the width of the recording sheet parallel with the linear path of the stylus but the bar has been omitted from Fig. 1 for the sake of clarity.

Figure 4:
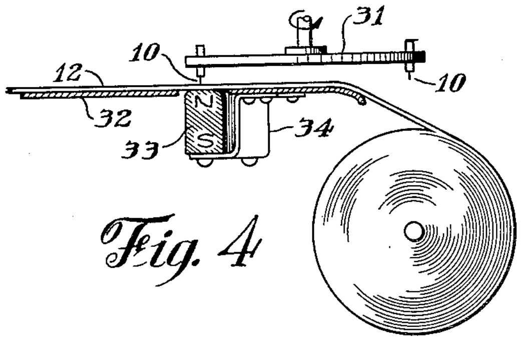
Figs. 4 and 5 are views of modifications of the invention.

The mechanism for obtaining relative scanning movement between the stylus and the recording sheet may take various forms in apparatus embodying the invention. For example, as shown in Fig. 4, the styli 10 may be carried in equally-spaced relation on the pivoted synchronously rotating disc 31 which is disposed above a base plate 32 supporting the recording sheet 12. The styli 10, which are freely movable lengthwise in their tubular holders in the disc 31, are held against the surface of the sheet 12 by a magnet 33 to take up wear and insure uniform contact pressure. As shown, the magnet 33 is of arcuate shape conforming to the scanning path traversed by the stylus 10 and is supported on a bracket 34.

Figure 5:
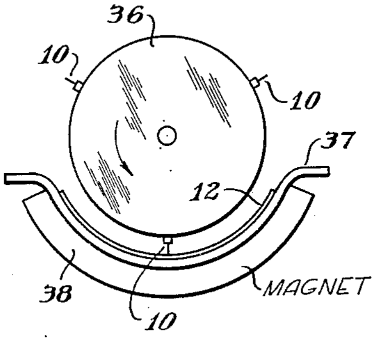

Another modification, shown in Fig. 5, employs radial styli 10 mounted on the rotating wheel 36, the sheet 12 being supported in a troughshaped support 37. The conventional arrangement for supporting and feeding the sheet 12, for example as shown in my prior Patent No. 1,719,392, granted July 2, 1929, may be employed. In accordance with the invention, a curved magnet 38 is disposed underneath the sheet 12 and preferably extends through a gap in the trough 37 into contact with the back surface of the sheet. As will be evident, the function of the magnets 33 and 38 in these modifications is the same as that of the magnet 22 in the modification shown in Figs. 1 and 2.

From the foregoing it will be seen that the invention provides an improved facsimile unit of the stylus electric-current conducting type which may be operated at a high rate of speed with uniform recording conditions and in which the wear of the stylus is effectively taken up automatically. Obviously the invention is applicable to either transmitters or recorders of the stylus type. It will also be apparent that, when required, replacement of the styli is a simple matter which can be accomplished by any unskilled attendant or operator by merely slipping a new stylus needle into the tubular holder 21 in place of the worn stylus needle. The term "needle" or "stylus needle" is used herein in its ordinary meaning; i. e., to refer to a small, slender rod of uniform cross-section or diameter, particularly where it fits into a holder.

Various changes in the detailed construction shown may be made without departing from the scope of the invention as defined in the appended claims.

I claim:

1. In a facsimile recorder of the type employing electro-sensitive recording paper, a frame, a travelling belt mounted thereon, means for supporting the recording paper with the recording area parallel to the span of said belt, a plurality of stylus needles each projecting laterally on both sides of and attached to said belt, said stylus needles being arranged to contact the surface of the recording paper at the recording area thereof, holders on said belt frictionally supporting each stylus needle, a contact segment adjacent the belt and mounted in a position to be engaged by the rear end of each stylus needle while it is in contact with the recording paper and means to urge each stylus needle through its holder toward the paper to insure uniform contact therewith during recording.

2. In a facsimile machine of the type having a sheet engaged by a scanning stylus, in combination, sheet-supporting means, a magnet disposed adjacent the back face of the sheet supported by the sheet-supporting means adjacent to the scanning area, a tubular stylus holder, a straight magnetizable stylus needle frictionally held in said holder and guided thereby for free sliding movement toward said sheet and means for supporting said stylus holder in proximity to the magnet to compensate for wear of the stylus by holding its tip magnetically against the face of the sheet during the scanning cycle.

3. In a facsimile recorder of the type employing electro-sensitive recording paper, in combination, a straight magnetizable stylus needle adapted to engage the surface of the recording paper, means for supporting and guiding said stylus needle for lengthwise free sliding movement thereof normal to the surface of the paper and a permanent magnet bar beneath the paper and adjacent to the recording area to hold the needle continuously against the surface of the paper by magnetic attraction while said supporting means remains in said recording area.

4. In a facsimile recorder of the type employing electro-sensitive recording paper, a plurality of magnetizable stylus needles, each having a straight, elongated shank portion of uniform cross-section, a movable carrier provided with equally spaced tubular holders closely fitting the shank portions of the stylus needles for slideably supporting said needles for movement axially thereof towards the surface of the paper, means for supporting and advancing the paper in operative relationship to said stylus needles and magnetic means located on the opposite side of said paper and opposite the record-receiving area of the paper for attracting the magnetizable stylus needles and insuring substantially uniform contact between the stylus needles and the paper.

5. In a facsimile recorder of the type employing electro-sensitive recording paper, a support for the paper, a traveling belt, a plurality of tubular stylus holders on said belt, a rod-shaped stylus needle of uniform cross-section in each holder freely movable axially thereof to engage the surface of the paper on said support and means for holding the tip of each stylus needle against the paper as the belt carries the stylus across the same, said means comprising a magnet adjacent the paper support at the stylus recording area and in a position to act on said needle to move said needle axially with respect to said support and into contact with said paper.

6. A facsimile stylus assembly comprising a tubular holder and a stylus needle freely slidable in the holder and projecting therefrom at the front end of the holder, said stylus needle having a straight needle-like shank portion and an integral offset portion at the rear end thereof and projecting laterally beyond the tubular holder.

7. In a recorder employing a record-receiving sheet, a stylus carrier, a straight needle-like stylus supported on said carrier for free sliding movement axially thereof, means for driving said carrier to bring said stylus intermittently into sheet engaging relation, means to maintain the stylus in a predetermined angular position on said carrier while in engagement with said sheet, and means to twist said stylus with respect to said carrier through a predetermined angular rotation about its longitudinal axis during non-engaging periods.

AUSTIN G. COOLEY.

REFERENCES CITED

The following references are of record in the file of this patent:

UNITED STATES PATENTS

| Number | Name | Date |
|---|---|---|
| 518,534 | Olan | Apr. 17, 1894 |
| 848,329 | Vawter | Mar. 26, 1907 |
| 899,043 | Harris | Sept. 22, 1908 |
| 1,666,330 | Ferree et al. | Apr. 17, 1928 |
| 2,164,473 | Randolph | July 4, 1939 |
| 2,212,970 | Finch | Aug. 27, 1940 |
| 2,278,919 | Erickson et al. | Apr. 7, 1942 |
| 2,282,929 | Billstein | May 12, 1942 |
| 2,375,267 | Wise | May 8, 1945 |
| 2,384,515 | Wise | Sept. 11, 1945 |
| 2,403,472 | Anderson | July 9, 1946 |
| 2,437,242 | Cole et al. | Mar. 9, 1948 |